(12) United States Patent
Kuhlman

(10) Patent No.: US 7,565,265 B2
(45) Date of Patent: Jul. 21, 2009

(54) METHOD AND APPARATUS FOR COMBINING OUTPUTS OF MULTIPLE SYSTEMS

(75) Inventor: Douglas A. Kuhlman, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 556 days.

(21) Appl. No.: 11/276,734

(22) Filed: Mar. 13, 2006

(65) Prior Publication Data

US 2007/0211923 A1  Sep. 13, 2007

(51) Int. Cl.
G06F 17/18 (2006.01)
G06F 19/00 (2006.01)

(52) U.S. Cl. ............... 702/181; 702/108; 702/179; 700/93; 726/5; 704/240

(58) Field of Classification Search ............... 702/108, 702/179, 181; 700/93; 726/5; 704/240; 341/107; 379/112.03; 382/116; 340/5.83
See application file for complete search history.

(56) References Cited

U.S. PATENT DOCUMENTS

| 6,028,897 | A | * | 2/2000 | Wang | 375/265 |
| 6,084,987 | A | * | 7/2000 | Allen | 382/239 |
| 6,118,900 | A | * | 9/2000 | Yokose et al. | 382/234 |
| 6,591,224 | B1 | | 7/2003 | Sullivan et al. | |
| 6,947,876 | B1 | | 9/2005 | Galaraza et al. | |
| 6,993,166 | B2 | | 1/2006 | Lo et al. | |
| 2004/0148526 | A1 | | 7/2004 | Sands et al. | |

FOREIGN PATENT DOCUMENTS

WO  WO2004034236  4/2004

OTHER PUBLICATIONS

Lee W. Young, "International Search Report and Written Opinion," WIPO, ISA/US, Nov. 4, 2008.

* cited by examiner

*Primary Examiner*—Edward Raymond
*Assistant Examiner*—Elias Desta

(57) ABSTRACT

Automatic recognition systems (100) includes multiple automatic recognition subsystems (102, 104, 106) that are cable of producing estimates of the probability that a subject matches a particular identity and a probability estimate combiner (108) that receives estimates from the multiple automatic recognition subsystems (102, 104, 106). The probability estimate combiner (108) has a number of properties which allow good use to be made of the individual estimates.

14 Claims, 6 Drawing Sheets

FIG. 2
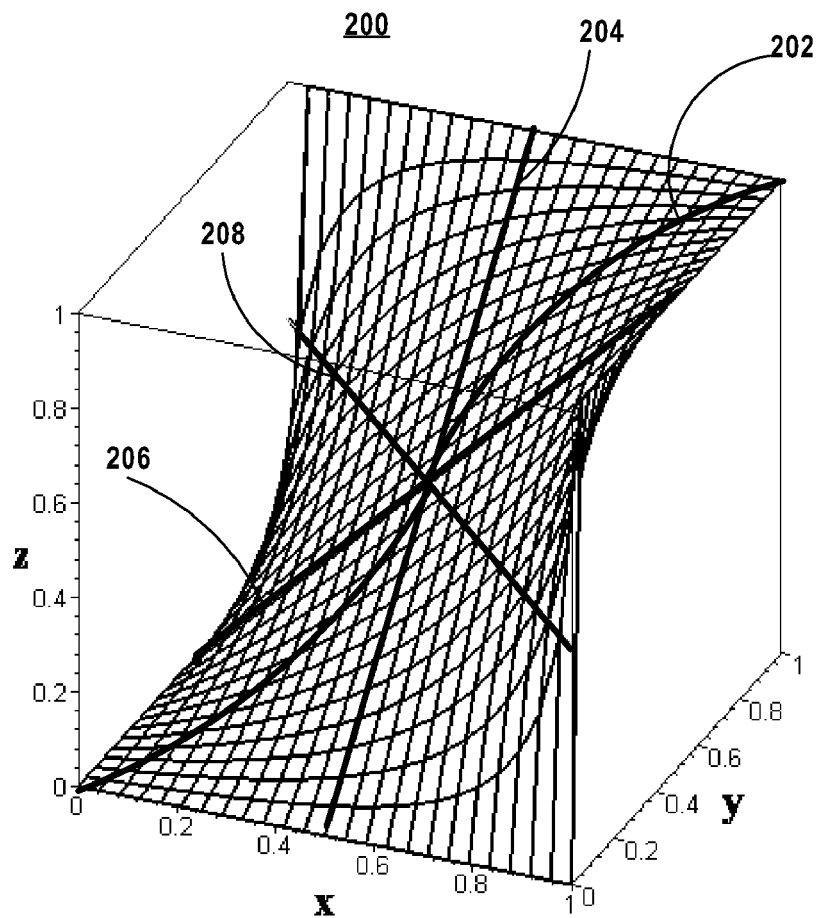
FIG. 3 |C(x,x)-0.5|>|x-0.5| for all x<>0.5,0.0,1.0
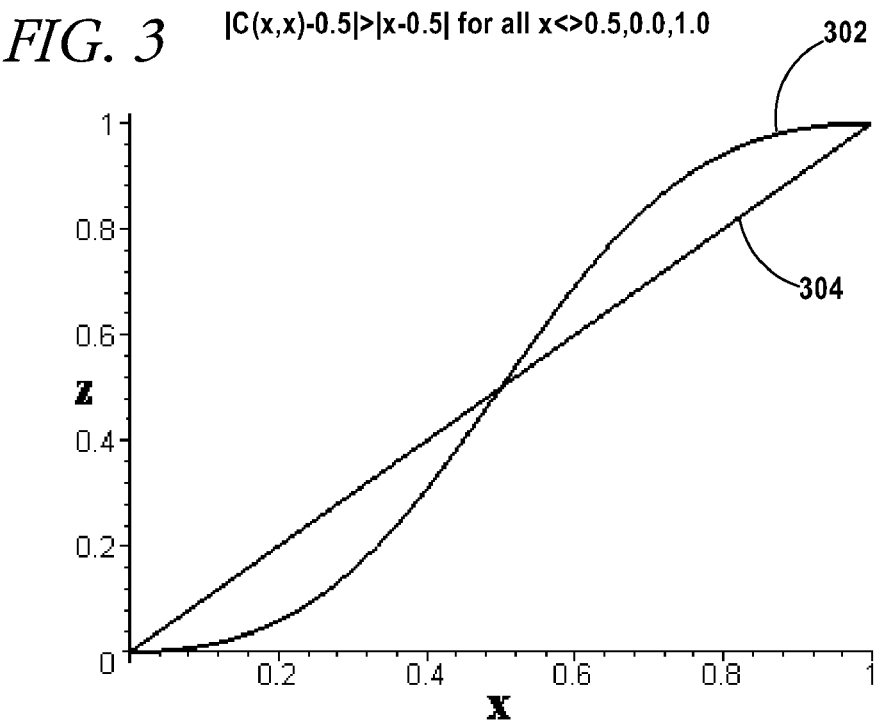

METHOD AND APPARATUS FOR COMBINING OUTPUTS OF MULTIPLE SYSTEMS

FIELD OF THE INVENTION

The present invention relates generally to automatic recognition systems such as biometric identification systems.

BACKGROUND

In the information age many information systems (e.g., credit card systems, driver's license management systems) have been developed which rely on assertions of identity by people being offered services through the systems. Moreover, as modern societies have developed, the scope of people's daily interactions has expanded to the point that parties from whom they are requesting services or with whom they are doing business, may not know them and thus may not be able to independently verify their identity. Thus, the problem of identity misrepresentation has developed. An extreme form of identity misrepresentation is identity theft.

The development of the Internet over the past decade has been accompanied by development of e-commerce in which two parties to a transaction are situated at distant locations and transactions are conducted via the Internet. Unfortunately, e-commerce allows for new modalities of business fraud, in particular, because the parties need not ever meet, it is possible for one party to a transaction to misrepresent their identity.

In the area of physical security, electronic systems that rely on technologies such as Radio Frequency Identification (RFID) access cards, and biometric sensors have been developed. As with any security means, these systems are not invulnerable and a sophisticated hacker may be able to undermine them.

Biometric systems take measurements such as images of a person's facial, fingerprint, retina, or iris, for example, and process the images using, for example statistical pattern recognition algorithms, in order to estimate one or more probabilities that the person being measured by the biometric system is in fact a particular person or one of a set of people whose data is stored in the biometric system.

Systems in which multiple biometric measurements are combined for the purpose of identity checking have been proposed. One way to combine multiple biometric identity probability estimates is to use the MIN function or the MAX function. However, doing so essentially discards the information represented in one of the measurements. Another way is to take two measurements that are normalized, if necessary, so that they are on the same scale and to average them. One property of averaging is that when it is applied to a high estimate that a person matches an identity, and a moderate estimate that the person matches the identity, rather than producing an even higher estimate that the person matches the identity, averaging will produce an estimate that is between the two estimates. In other words, by the process of averaging, multiple estimates that indicate, to varying degrees, that a person has a particular identity do not reinforce each other to yield an estimate that reflects a greater degree of certainty that the person matches the identity. Yet another way of combining two estimates of the probability that a person matches an identity is to multiply the two estimates.

More generally, beyond recognizing people, pattern recognition techniques can be used to recognize other things, such as spoken words, and handwritten text, for example.

What is needed is an improved system and method for combining multiple estimates of the probability that a person or thing matches an identity.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a surface plot of a function for combining two estimates of the probability that a particular object or person has a particular identity;

FIG. 3 is 2-D section through the surface plot shown in FIG. 2 showing a plane in which the two independent variables (two estimates) are equal;

Figure 1:
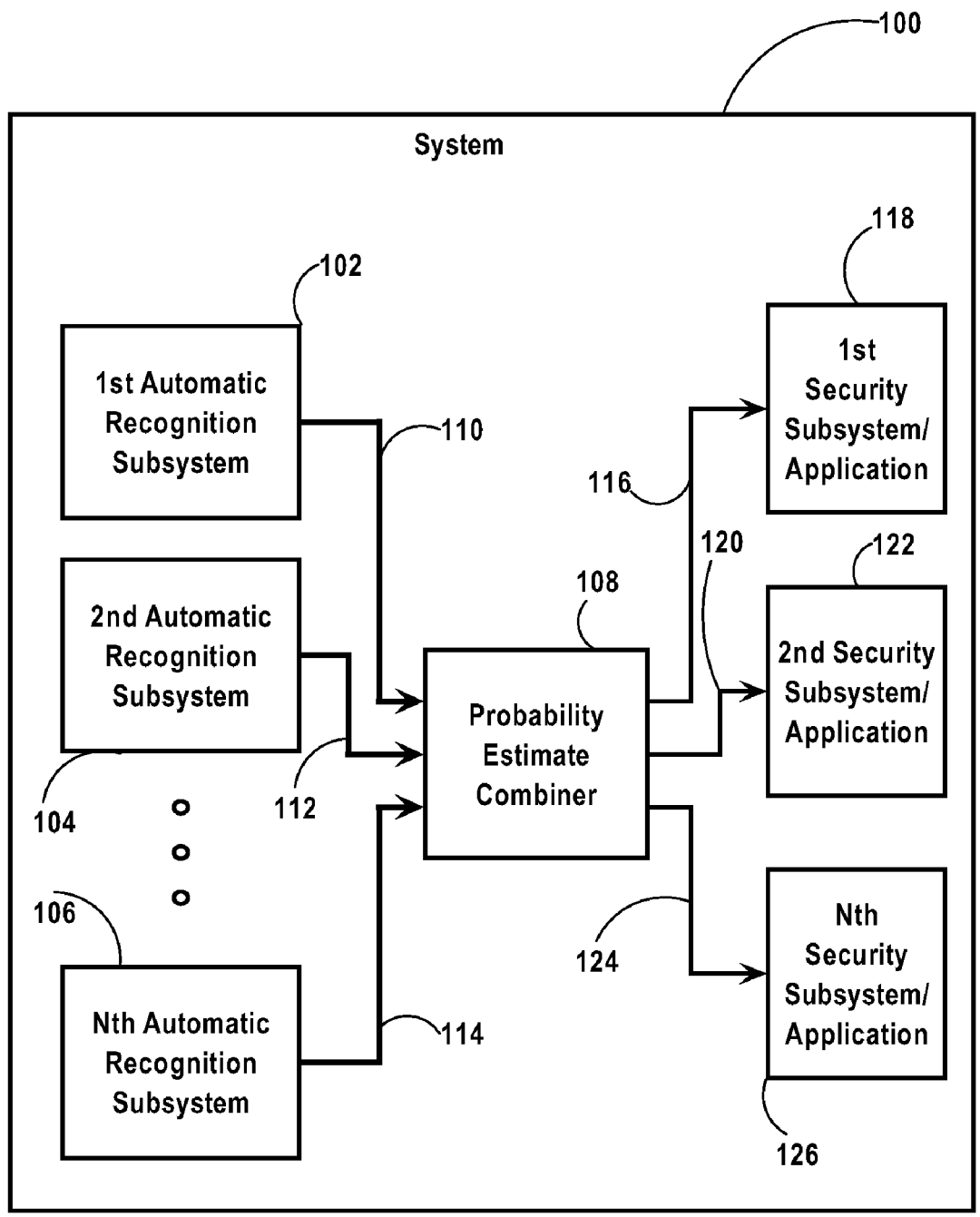
FIG. 1 is functional block diagram of a system for performing automatic recognition, according to certain embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to automatic recognition. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of automatic recognition described herein. The non-processor circuits may include, but are not limited to, a radio receiver, a radio transmitter, signal drivers, clock circuits, power source circuits, and user input devices. As such, these functions may be interpreted as steps of a method to perform automatic recognition. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a functional block diagram of system 100 for performing automatic recognition, according to certain embodiments of the invention. The system 100 comprises a plurality of automatic recognition subsystems including a first automatic recognition subsystem 102, a second automatic recognition subsystem 104 and an Nth automatic recognition subsystem 106. Although only three automatic recognition subsystems 102, 104, 106 are shown for the purpose of illustration, in practice more than three can be utilized.

By way of example, the three automatic recognition subsystems 102, 104, 106 can comprise pattern recognition systems such as statistical pattern recognition systems or Artificial Neural Network (ANN) based pattern recognitions systems. The automatic recognition subsystems 102, 104, 106 can comprise biometric or non biometric systems. The present invention can be used with extant automatic recognition systems or automatic recognition systems that are developed in the future. Internal details of extant automatic recognition systems are well known to those of ordinary skill in the art and are therefore not provided herein.

In general automatic recognition systems such as statistical pattern recognition systems or ANN based recognition systems take measurements of aspects of a person or object to be recognized and output an estimate of a probability that the person or object corresponds to a particular identity or estimates of probabilities that the person or object corresponds to each of multiple identities. For example, the measurements can take the form of an image of a fingerprint, retina, iris or facial. The output is often normalized to the range zero to one. Such output normalization is generally possible, and methods of normalization will be apparent to persons having ordinary skill in the art.

In some applications, a user asserts a particular identity (e.g., his or her actual identity) by presenting an electronic identification device, or entering a log-on ID or name, and is then scanned by a biometric sensor. In such applications only the probability that the person has the asserted identity is typically of interest. In some applications a simple true or false output is produced by comparing the estimated probability to a predetermined threshold.

In the system 100 probability estimates produced by the first, second and Nth automatic recognition subsystems 102, 104, 106 are coupled to a probability estimate combiner 108 through a first data coupling 110, a second data coupling 112 and an Nth data coupling 114 respectively. The probability estimate combiner 108 outputs a combined probability estimate that is based on the estimates output by the first, second and Nth automatic recognition subsystems 102, 104, 106. The output of the probability estimate combiner 108 is coupled through a first output data coupling 116, a second output data coupling 120 and an Nth output data coupling 124 to a first security subsystem or application 118, a second security subsystem or applications 122 and an Nth security subsystem or application 126 respectively. The first, second and Nth data couplings 110, 112, 114 and the first, second and Nth output data couplings 116, 120, 124 can, for example, take the form of wired, optical and/or wireless communication channels. Moreover, the data couplings 110, 112, 114 and the output data couplings 116, 120, 124 can be short range links, or network circuits that carry signals over larger distances. By way of nonlimiting example, the security application or subsystems 118, 122, 126 can be systems that provide security to computer resources, financial transactions, personal information, or physical security at a facility. Each of the security subsystems or applications 118, 122, 126 can have different security requirements, and therefore may test the combined probability estimate output by the probability estimate combiner 108 to a different threshold.

According to alternative embodiments of the invention, one or more of the security subsystems or applications 118, 122, 126 is replaced by another type of system that relies on identification of persons or objects. For example, a variety of systems in a car, such as an audio system, electrically adjustable seats, a climate control system, and an electronically tunable suspension can be adjusted to suit a particular driver's preferences based on the combined probability estimate that a driver has a particular identity. As another example, a desktop of a computer interface can be adjusted to a particular user's preferred state based on the combined probability estimate.

The probability estimate combiner 108 implements a function that has properties that make it particularly suitable for combining probability estimates to obtain an overall probability estimate. The function implemented by the result function evaluator 108 in accordance with embodiments of the present invention is termed herein a combiner function. The combiner function accepts two or more probability estimates as input and outputs a combined probability estimate.

The aforementioned properties are described below with reference to one particular combiner function which can be represented by a closed form mathematical expression, however it should be understand that other combiner functions which share some or all of the desirable properties, to be described, can alternatively be used in certain embodiments of the invention.

A particular suitable probability estimate combiner function is given by:

$$C(x, y) = \frac{2xy}{1 + (2x-1)(2y-1)} \quad \text{EQU. 1}$$

where, x is a first independent variable (input for a first probability estimate); and y is a second independent variable (input for a second probability estimate);

FIG. 2 is a surface plot 200 of the above function for combining two estimates of the probability that a particular object or person has a particular identity. (Hereinbelow the term subject is used as a generic term referring to a person or object being automatically recognized.) In FIG. 2, the horizontal axes are the x-axis and the y-axis and the vertical z-axis gives the function value. The domain covers an x-axis interval from zero to one and a y-axis interval from zero to one as well.

A first desirable property of a combiner function that the particular combiner function shown in equation 1 and FIG. 2 has is that the range of the function is also from zero to one. If one of the security application or subsystem 118, 122, 126 that rely on automatic recognition is, as is typical, designed to work with recognition probability estimates that range from zero to one, then providing two automatic recognition subsystems (e.g., 102, 104, 106) and the probability estimate combiner 108 will not necessitate modification of the security application or subsystem 118 because the probability estimate combiner 108 keeps probability estimates in the range zero to one. If necessary the inputs to, or outputs of the probability estimate combiner 108 can be scaled.

Typically a value of the 1.0 of the input or output of the combiner function shown in FIG. 1 represents the highest probability that a subject being identified matches a particular identity, a value of zero of the input or output of the function represents the highest probability that the subject does not match the particular identity and a value of 0.5 of the input or output represents a neutral point at which there is equal probability that the subject does and does not match the particular identity.

In practice when using the function given by equation 1 in the probability estimate combiner 108, inputs should be restricted to the open domain (0,1) as opposed to the closed domain [0,1] in order to avoid divide by zero errors, which could occur in some floating point systems if one input is equal to one and the other is equal to zero.

More generally, even if a different domain is used, according to a generalization of the first property, the range is equal to the domain. A second desirable property of a combiner function that the particular combiner function shown in equation 1 and FIG. 2 has is that it is commutative. The commutative property is expressed by equation 2.

$$C(x,y)=C(y,x) \quad \text{EQU. 2}$$

The commutative property is apparent from the symmetry of the appearance of the variables in equation 1.

A third desirable property of a combiner function that the particular combiner function shown in equation 1 and FIG. 2 has is that it is associative, that is $$C(C(u,v),w)=C(u,C(v,w)) \quad \text{EQU. 3}$$

To shown that the function is associative one can first plug in two arbitrary values u and v for x and y in equation 1 yielding a full expression for the inner application of the function in the left hand side of the equation 3. This yields:

$$C(u, v) = \frac{2uv}{1 + (2u-1)(2v-1)} \quad \text{EQU. 4}$$

One can then plug this result and another arbitrary variable w into the function again yielding:

$$C(C(u, v), w) = \frac{uvw}{(1 + (2u-1)(2v-1))\left(1 + \left(4\frac{uv}{1+(2u-1)(2v-1)} - 1\right)(2w-1)\right)} \quad \text{EQU. 5}$$

which reduces to:

$$C(C(u, v), w) = \frac{uvw}{1 - u - v - w + uv + uw + vw} \quad \text{EQU. 6}$$

From the symmetry of the appearance of the variables u,v,w in the expression on the right hand side of equation 6 and from the commutative property of the combiner function it follows that the combiner function is associative.

Having the associative and commutative properties allows the probability estimate combiner 108 to apply the combiner function (e.g., the function given by equation 1) recursively to more than two recognition probability estimates, taken in any order, without the concern that the result obtained on one system will differ from the result obtained on another system if the probability estimates are taken in a different order.

Moreover, because of the first property any number of recognition probability estimates (e.g., from facial recognition, retinal recognition, iris recognition, etc.) can be used while keeping the output in the range zero to one. The fact that the range is maintained between zero and one regardless of the number of probability estimates inputs, facilitates standard interfacing to the output of the probability estimate combiner 108 even though some facilities or individual systems may have more automatic recognition subsystems than others. For example in an industrial facility, access to some areas may be restricted on the basis of fingerprint recognition alone, whereas access to more important areas may be restricted on the basis of fingerprint and iris scans.

A fourth desirable property of a combiner function that the particular combiner function given in equation 1 has is that probability estimates that agree as to whether a test subject matches a tested identity reinforce each other. In a particular case of this property when the two inputs to the combiner function are equal, the output of the combiner function will be stronger (further from the neutral point, i.e., 0.5 in the case of the combiner function given by equation 1) than the inputs. The latter specific case of the fourth property is stated mathematically as:

$$|C(x,x)-0.5|>|x-0.5| \text{ for all } x<>0.5 \text{ in the open domain } (0,1) \quad \text{EQU. 7}$$

The particular combiner function given by equation 1 can be shown to have this property by making the substitution y=x in equation 1 which yields:

$$C(x, x) = \frac{x^2}{1 + 2x^2 - 2x} \qquad \text{EQU. 8}$$

FIG. 3 is 2-D section through the surface plot shown in FIG. 2 showing a plane in which the two independent variables (two estimates) are equal, i.e., y=x, across the interval of interest (0,1). A first curve 302, given by equation 8 is the particular combiner function given by equation 1 in the plane y=x. A straight line 304 which has unity slope is shown for reference. The contour of the combiner function through the plane y=x is also indicated at 202 in FIG. 2. As shown in FIG. 3 for any value x in the open domain (0,1) not equal to 0.5, the output of the combiner function has a value that is further from 0.5 than the input value of x. The practical import of this is that if multiple assessments as to whether a subject matches an identity are in general agreement, the combined output of the probability estimate combiner 108 will be further strengthened. For example if one automatic recognition subsystem (e.g., a retinal scan) gives a probability of 0.8 that a subject matches a particular identity, and a second automatic recognition subsystem (e.g., a facial recognition system) gives a probability of 0.75 that a subject matches a particular identity, the output of the probability estimate combiner 108, if based on equation 1, would be 0.923. Thus, the functioning of the probability estimate combiner 108 is qualitatively different than a similar subsystem based on averaging. In a system based on averaging, two probability estimates that generally agree would not combine to produce a combined estimate that is stronger than either—the combined estimate will be no higher than the higher estimate.

A generalization of the fourth property, that also applies to the particular combiner function given by equation 1 is that the quantity $C(X, X)$ is further from a first predetermined value $X_0$ than X, for all values of X not equal to $X_0$ and not equal to bounds of a predetermined domain, where the predetermined value $X_0$ is an interior point in the predetermined domain that corresponds to equal probability that the subject does and does not have the particular identity.

A fifth desirable property of a combiner function that the particular combiner function given in equation 1 has is that if one input probability has a neutral value (e.g., 0.5 in the case of the particular combiner function given by equation 1), the combiner function will simply reflect the other output. To show this fifth property for equation 1 one makes the substitution x=0.5 as in equation 9 below. (Intermediate algebraic steps are not shown.)

$$C(0.5, y) \rightarrow \frac{2(0.5)y}{1 + (2(0.5) - 1)(2y - 1)} = y \qquad \text{EQU. 9}$$

The linear profiles of the combiner function through the planes x=0.5 and y=0.5 are indicated by lines 204 and 206 respectively in FIG. 2. According to the fifth property, inputs that essentially do not contain any information do not affect the output of the probability estimate combiner 108. Note that if simple averaging were used, neutral inputs (e.g., equal to 0.5) would pull the output closer to 0.5.

A sixth desirable property of a combiner function for combining probability estimates that the particular combiner function given in equation 1 has is that contradictory indications as to whether a test subject matches a predetermined identity tend to cancel each other. That is, if one input probability estimate indicates that a test subject does not match a particular identity (e.g., gives a probability estimate input <0.5 in the case of the combiner function shown in equation 1) and a second input probability estimate indicates that the test subject does, in fact, match the particular identity (e.g., give a probability estimate input >0.5 in the case of the combiner function shown in equation 1) the output of the combiner function implemented in the probability estimate combiner 108 will be closer to neutral than either of the two inputs. In the case of the combiner function given in equation 1, if the input probability estimates differ from 0.5 by equal magnitude, opposite sign amounts, the output of the combiner function will be neutral, i.e., equal to 0.5. This is shown in equation 10, without intermediate algebraic simplification steps.

$$C(0.5 - m, 0.5 + m) = \frac{2(0.5 - m)(0.5 + m)}{1 + (2(0.5 - m) - 1)(2(0.5 + m) - 1)} = 0.5 \qquad \text{EQU. 10}$$

The constraints x=0.5−m, y=0.5+m parametrically restrict the combiner function to a plane in which y=1−x. The profile of the combiner function in the latter plane is indicated by line 208 in FIG. 2 which is at a constant level of Z=0.5 as expected.

Figure 4:
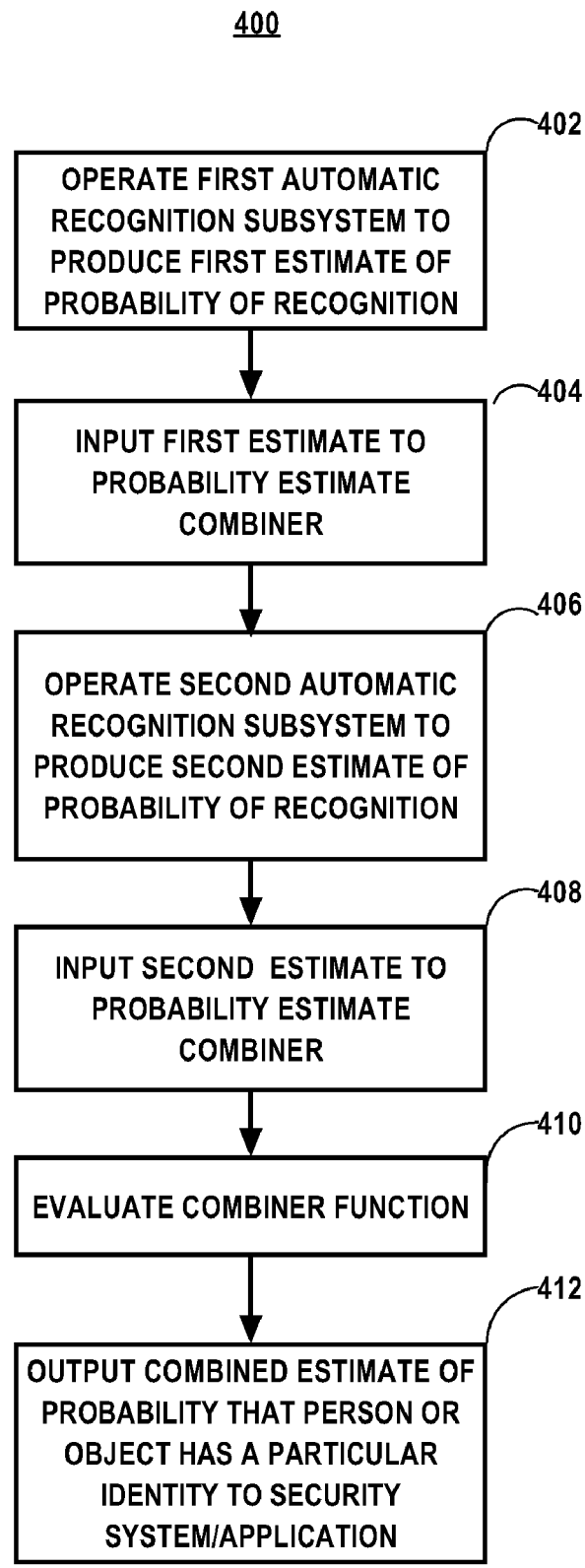
FIG. 4 is a flow chart of a method for performing automatic recognition, according to certain embodiments of the invention.

FIG. 4 is a flow chart 400 of a method for performing automatic recognition, according to certain embodiments of the invention. In block 402 a first automatic recognition system (e.g., 102) is operated to produce a first estimate of a probability of recognition of a subject. In block 404 the first estimate is input to the probability estimate combiner 108. In block 406 a second automatic recognition system is operated to produce a second estimate of the probability of recognition of the subject. In block 408 the second estimate is input to the probability estimate combiner 108. (If more than two automatic recognition systems are used these would be operated and the estimates they produce would be input to the combiner function evaluator.) In block 410 the combiner function (e.g., that given by equation 1) is evaluated to produced a combined estimate of the probability of recognition of the subject and in block 412 the combined estimate is output to the security application or system 118. Optionally, rather than passing the combined estimate to the security system or application 118, the combined estimate is compared to a threshold in order to obtain a TRUE or FALSE indication and the TRUE or FALSE indication is passed to the security system or application 118.

Figure 5:
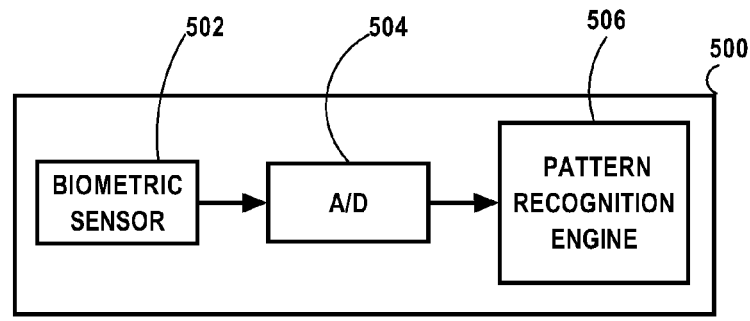
FIG. 5 is a functional block diagram of a biometric automatic recognition subsystem that is used in the system shown in FIG. 1 according to embodiments of the invention.

FIG. 5 is a functional block diagram of a biometric automatic recognition subsystem 500 that is used in the system shown in FIG. 1 according to embodiments of the invention. One or more of the recognition subsystems 102, 104, 106 shown in FIG. 1 can have the architecture shown in FIG. 5. The biometric automatic recognition subsystem 500 comprises a biometric sensor 502, that is coupled through an analog-to-digital converter (A/D) 504 to a pattern recognition engine 506. The biometric sensor 502 can, for example take the form of a fingerprint, iris, or retina camera. Biometric measurements are made using the biometric sensor 502. The automatic recognition engine 506 comprises a feature vector extraction front end and can, for example include an ANN or statistical pattern recognition based module for processing feature vectors to compute a probability estimate.

Figure 6:
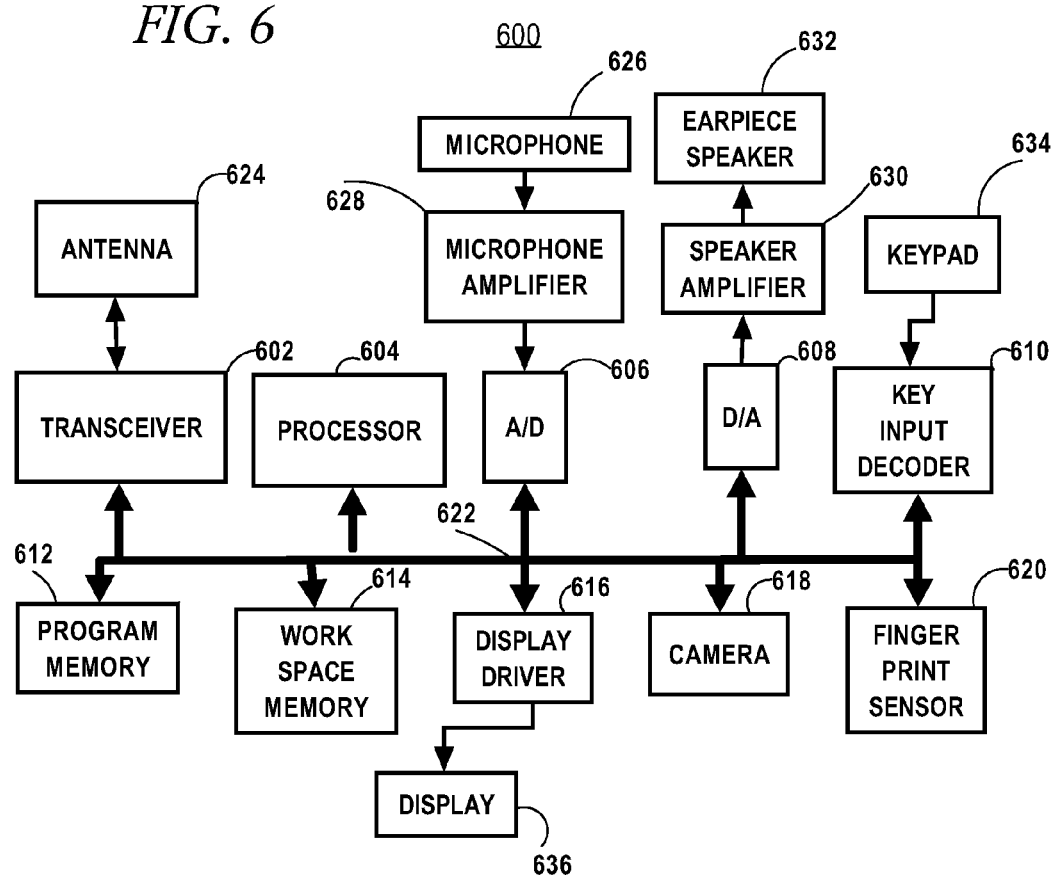
FIG. 6 is a hardware block diagram of a device that is capable of performing automatic recognition according to an embodiment of the invention.

FIG. 6 is a hardware block diagram of a wireless communication device 600 that is capable of performing automatic recognition according to an embodiment of the invention. As shown in FIG. 6, the device 600 comprises a transceiver 602, a processor 604, an analog-to-digital converter (A/D) 606, a digital-to-analog converter (D/A) 608, a key input decoder 610, a program memory 612, a workspace memory 614, a display driver 616, a camera 618, and a fingerprint sensor 620 coupled together through a signal bus 622.

The transceiver 602 is coupled to an antenna 624. Microwave or RF signals modulated with information pass between the transceiver 602 and the antenna 624. The transceiver 600 can be used to communicated combined probability estimates and/or decayed combined probability estimates to other systems that rely on estimates generated by the device 600.

The processor 604 uses the workspace memory 614 to execute control programs for the device 600 that are stored in the program memory 612. The control programs include one or more programs that carry out the processes described above with reference to FIGS. 1-5. The program memory 612 is one form of computer readable medium on which such programs may be stored. Alternatively, such programs are stored on other types of computer readable media.

A microphone 626 is coupled through a microphone amplifier 628 to the A/D 606. Spoken utterances are digitized by the A/D 606 and made available to the processor 604 (or a specialized processor, not shown) for audio encoding and voice recognition. Programs for performing voice recognition are stored in the program memory 612 and executed by the processor 604. Voice recognition is used to determine a first estimate of a probability that a user of the device 600 has a predetermined identity (e.g., the identity of a single owner of the device 600.)

The D/A 608 is coupled through a speaker amplifier 630 to an earpiece speaker 632. Digitally encoded audio, e.g., spoken words, are converted to analog form by the D/A 608 and output through the speaker 632.

The key input decoder 610 is coupled to a keypad 634. The key input decoder 610 identifies depressed keys to the processor 604. The device 600 can generate a second estimate that the user of the device has the predetermined identity by comparing an average keystroke rate of the user, to a previously stored distribution (e.g., Gaussian mixture) of keystroke rate for the predetermined identity (e.g., the single owner).

The camera 618 is used to take a picture of the user's face which is then processed by facial recognition software that is stored in the program memory 612 and executed by the processor 604. Facial recognition provides a third estimate of the probability that the user of the device 600 has the predetermined identity.

The fingerprint sensor 620 works in conjunction with fingerprint recognition software that is stored in the program memory 612 and executed by the processor 604. The fingerprint recognition software provides a fourth estimate of the probability that the user of the devices has the predetermined identity. The first through fourth estimates of the probability that the user of the device has the predetermined identity are used to compute a combined estimate as described in more detail above.

The probability estimate combiner 108 is suitably implemented as a program that is stored in the program memory 612 and executed by the processor 604. Alternatively, the probability estimate combiner 108 can be implemented using an application specific logic circuit.

The display driver 616 is coupled to a display 636. The display 636 can be used to output messages indicating that the user has successfully been identified by the device.

Figure 7:
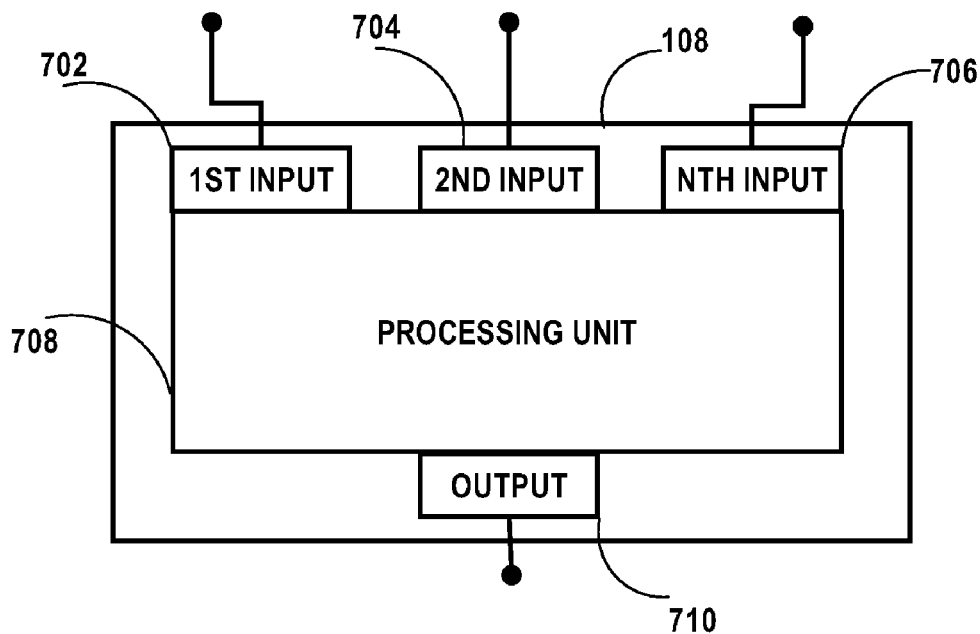
FIG. 7 is a block diagram of a probability estimate combiner according to certain embodiments of the invention.

FIG. 7 is a block diagram of the probability estimate combiner 108 according to certain embodiments of the invention. As shown in FIG. 7 the probability estimate combiner 108 comprises a first input 702, a second input 704, and an Nth input 706 coupled to a processing unit 708. The processing unit 708 is coupled to an output 710. The processing unit 708 suitably comprises, by way of example, a microprocessor coupled to a memory that stores programming instructions for executing the combiner function, an Application Specific Integrated Circuit (ASIC) adapted to execute the combiner function, or a Field Programmable Gate Array (FPGA) adapted to execute the combiner function. Separate probability estimates are received at the inputs 702, 704, 706 and a combined probability estimate is output at the output 710.

Figure 8:
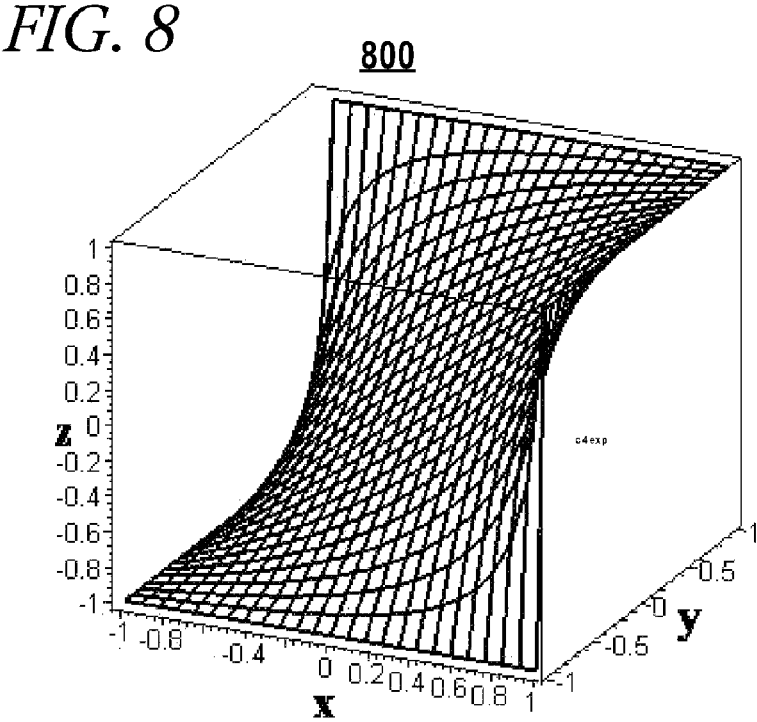
FIG. 8 is a surface plot of a second function for combining two estimates of the probability that a particular object or person has a particular identity.

FIG. 8 is a surface plot 800 of a second function for combining two estimates of the probability that a particular object or person has a particular identity. The second function for combining two estimates is given by equation 11.

$$C(x, y) = \frac{x + y}{1 + xy} \qquad \text{EQU. 11}$$

Figure 9:
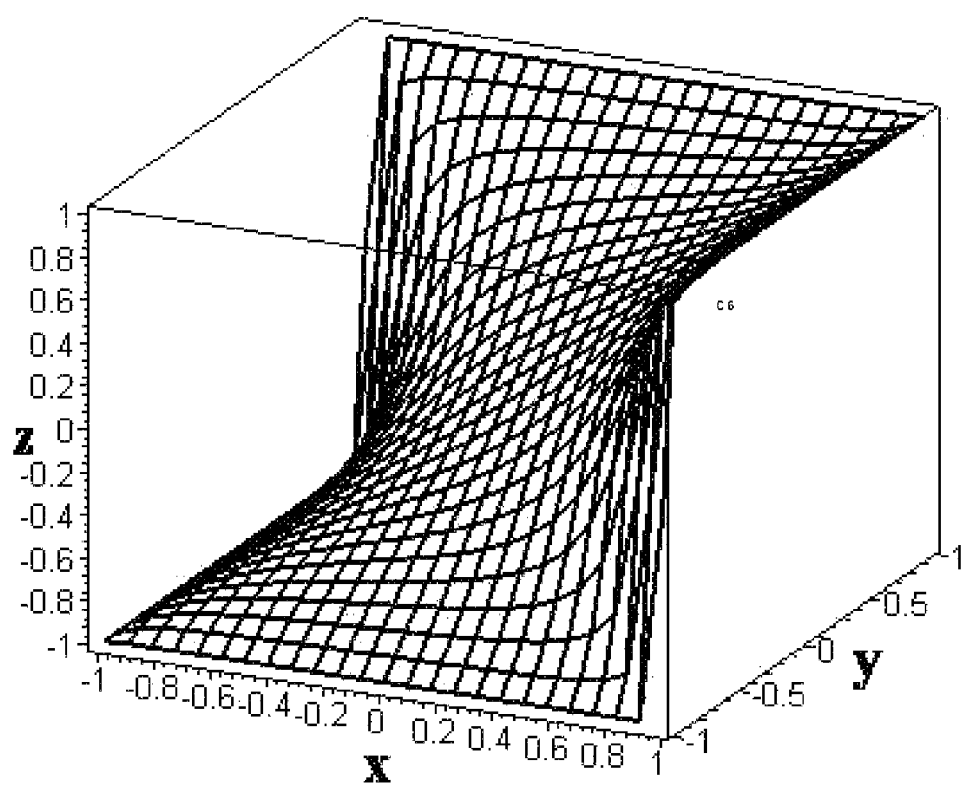
FIG. 9 is a surface plot of a third function for combining two estimates of the probability that a particular object or person has a particular identity.

FIG. 9 is a surface plot 900 of a third function for combining two estimates of the probability that a particular object or person has a particular identity. The third function for combining two estimates is given by equation 12.

$$C(x, y) = -\frac{1 - \sqrt{1 + 4f(x, y)^2}}{2f(x, y)} \qquad \text{EQU. 12}$$

where, $$f(x, y) = \frac{(x + y)(1 - xy)}{(1 - x^2)(1 - y^2)} \qquad \text{EQU. 13}$$

The domain and range of the second and third function for combining estimates is (-1,1) and in the case of the second and third function for combining estimates zero is the neutral value that represents equal probability that the subject does and does not match a tested identity. The second and third functions for combining estimates, share the properties of the first function for combining estimates that are described above. One skilled in the art will appreciate that other functions which have these properties could also be used.

Automatic recognition systems according to the invention can use biometric measurements for living subjects and other recognition (e.g., pattern recognition) techniques for nonliving subjects. Although the invention has been described above with reference to embodiments in which the probability estimates that are combined indicate the likelihood that a subject matches a particular identity, the invention is not limited to applications involving identification of subjects, rather probability estimate combiners described above can be used to combine estimates (e.g., in the form in digital signals) in a variety of systems, including, but not limited to signal processing, fuzzy logic, and control systems.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A probability estimate combiner comprising:
   a processing unit;
   a first input coupled to said processing unit;
   a second input coupled to said processing unit; and
   an output coupled to said processing unit;
   wherein said processing unit is adapted to execute a function C that has:
      a first property by which a quantity $C(X, X)$ is further from a predetermined value $X_0$ than X, for all values of X in a predetermined domain of X not equal to $X_0$ and not equal to a set of bounds of the predetermined domain, wherein $X_0$ is an interior point in the predetermined domain that corresponds to equal probability that a result is true and false;
      a second property by which $C(X, X_0)$ is equal to X; and
      a third property by which a quantity $C(X_0-\Delta X, X_0+\Delta X)$ is equal to $X_0$, where $\Delta X$ is an increment;
   wherein the processing unit outputs, at the output, a combined probability estimate that is obtained by evaluating the function C.

2. A method of performing automatic identification comprising:
   operating a first automatic identification system to obtain a first estimate of a probability that a subject has a particular identity;
   operating a second automatic identification system to obtain a second estimate of the probability that the subject has the particular identity;
   inputting the first estimate and the second estimate of the probability to a function C of at least the first estimate and the second estimate that has:
      a first property by which a quantity $C(X, X)$ is further from a first predetermined value $X_0$ than X, for all values of X in a predetermined domain of X not equal to $X_0$ and not equal to a set of bounds of the predetermined domain, wherein $X_0$ is an interior point in the predetermined domain that corresponds to equal probability that the subject does and does not have the particular identity; and
      a second property by which $C(X, X_0)$ is equal to X; and
   evaluating the function C to obtain a combined estimate of the probability that the subject has the particular identity.

3. The method of performing automatic identification according to claim 2 wherein inputting the first estimate and the second estimate of the probability to the function C comprises:
   inputting the first estimate and the second estimate of the probability to a function that has a third property by which a quantity $C(X_0-\Delta X, X_0+\Delta X)$ is equal to $X_0$, where $\Delta X$ is an increment.

4. The method of performing automatic identification according to claim 2 wherein inputting the first estimate and the second estimate of the probability to the function C of comprises:
   inputting the first estimate and the second estimate of the probability to a function that has the commutative property and the associative property.

5. The method of performing automatic identification according to claim 2 wherein inputting the first estimate and the second estimate of the probability to the function C comprises:
   inputting the first estimate and the second estimate of the probability to a function that has a third property that, at least over the predetermined domain, a range of the function is equal to the predetermined domain.

6. The method of performing automatic identification according to claim 2 wherein obtaining the first estimate of the probability that the subject has the particular identity comprises:
   operating a statistical pattern recognition system.

7. The method of performing automatic identification according to claim 6 wherein operating the statistical pattern recognition system comprises:
   operating a biometric statistical pattern recognition system.

8. A system comprising:
   a first automatic identification subsystem adapted to take data from a subject and to output a first estimate of a probability that the subject has a particular identity;
   a second automatic identification subsystem adapted to take data from the subject and to output a second estimate of the probability that the subject has the particular identity;
   a function evaluator adapted to receive the first estimate and the second estimate and to evaluate a function C of the first estimate and the second estimate wherein the function C has:
      a first property by which a quantity $C(X, X)$ is further from a first predetermined value $X_0$ than X, for all values of X in a predetermined domain of X not equal to $X_0$ and not equal to a set of bounds of the predetermined domain, wherein $X_0$ is an interior point in the predetermined domain that corresponds to equal probability that the subject does and does not have the particular identity; and
      a second property by which $C(X, X_0)$ is equal to X; and
   wherein the function evaluator is further adapted to output a combined estimate of the probability that the subject has the particular identity, that is obtained by evaluating the function C.

9. The system according to claim 8 wherein the function evaluator is adapted to evaluate the function that has a third property by which a quantity $C(X_0-\Delta X, X_0+\Delta X)$ is equal to $X_0$, where $\Delta X$ is an increment 10. The system according to claim 8 wherein the function evaluator is adapted to evaluate the function that has the commutative property and the associative property.

11. The system according to claim 8 wherein the function evaluator is adapted to evaluate the function that has a third property that, at least over the predetermined domain, a range of the function is equal to the predetermined domain.

12. The system according to claim 8 wherein the first automatic identification subsystem comprises:
   a statistical pattern recognition subsystem.

13. The system according to claim 12 wherein the statistical pattern recognition subsystem comprises:
   a biometric statistical pattern recognition system.

14. A method of performing automatic identification comprising:
   receiving a first estimate of a probability that a subject has a particular identity from a first automatic identification system;
   receiving a second estimate of the probability that the subject has the particular identity from a second automatic identification system:
   inputting the first estimate and the second estimate of the probability to a function C of at least the first estimate and the second estimate that has:
      a first property by which a quantity $C(X, X)$ is further from a first predetermined value $X_0$ than X, for all values of X in a predetermined domain of X not equal to $X_0$ and not equal to a set of bounds of the predetermined domain, wherein $X_0$ is an interior point in the predetermined domain that corresponds to equal probability that the subject does and does not have the particular identity; and a second property by which $C(X, X_0)$ is equal to X; and evaluating the function C to obtain a combined estimate of the probability that the subject has the particular identity.

* * * * *